Jan. 22, 1957 C. HICKERSON, JR 2,778,151

SLIDING DRAWER AND ADAPTER FOR TELEPHONE BASE

Filed Feb. 3, 1955 2 Sheets-Sheet 1

Carlos Hickerson, Jr.
INVENTOR.

BY Clarence A. O'Brien
and Harvey B. Jacobson
Attorneys

Jan. 22, 1957

C. HICKERSON, JR 2,778,151

SLIDING DRAWER AND ADAPTER FOR TELEPHONE BASE

Filed Feb. 3, 1955

2 Sheets-Sheet 2

Carlos Hickerson, Jr.
INVENTOR.

BY Clarence A. O'Brien
and Harvey B. Jacobson
Attorneys

United States Patent Office 2,778,151
Patented Jan. 22, 1957

2,778,151

SLIDING DRAWER AND ADAPTER FOR TELEPHONE BASE

Carlos Hickerson, Jr., El Paso, Tex.

Application February 3, 1955, Serial No. 486,000
2 Claims. (Cl. 45—.5)

This invention relates to a novelly constructed and functioning attachment for the base of the stand of a so-called dial telephone, and has reference in particular to a sliding drawer and an adapter for operatively associating the same with the underneath side of the base of the stated telephone, said drawer being expressly designed and constructed to contain a pad, card or the like with predetermined telephone numbers and other complemental data thereon.

The above is not to say that pad containing trays, drawers and similar reference pad holders have not already been conceived of and promoted for use by others. As a matter of fact, the art to which the invention relates invokes the use of many and varied styles and forms of pad-equipped structures.

What with the fact that prior art adaptations in the field of endeavor under consideration are not, evidently, in widespread use by members of the public, there is reason to believe that for one reason or another they have not met with approval or with unqualified endorsement for adoption and use by the public at large. Such being the assumed situation, it is an obvious objective here to more aptly and satisfactorily utilize the existing space beneath the bottom of the telephone base and within the somewhat confining limits of the usual corner pads, and to attain this end through the medium of a structural attachment which is such that it will meet with the endorsement of manufacturers, telephone company officials, users and any and all others mutually or otherwise concerned therewith.

Briefly summarized, the subject matter of the invention may therefore be said to invoke the use of a dial telephone stand having the customary flat-bottomed base and four corner pads providing feet and defining an available space within the limits of said pads and marginal vertical portions of said base, and an insertable and removable attachment-type accessory occupying said space and characterized by a relatively stationary adapter unit having a drawer compartment and a drawer removably and slidably mounted in said compartment.

In carrying out a preferred embodiment of the invention, the adapter unit takes the form of a flat-faced bottom wall having a pair of spaced parallel angle members affixed to the top surface and located somewhere near the central portion of said bottom so as to cooperate therewith in defining a channel-like compartment in which the drawer is slidable, the lengthwise portions of said bottom, outwardly of the respective angle members projecting between the adjacent pair of forward and rearward pads and being provided along their outward edges with vertical upstanding stabilizing flanges contacting the bottom side of said base and flush with the vertical wall portions of said base.

Other objects, features and advantages will become more readily apparent from the following description and the accompanying sheet of illustrative drawings.

Figure 2:
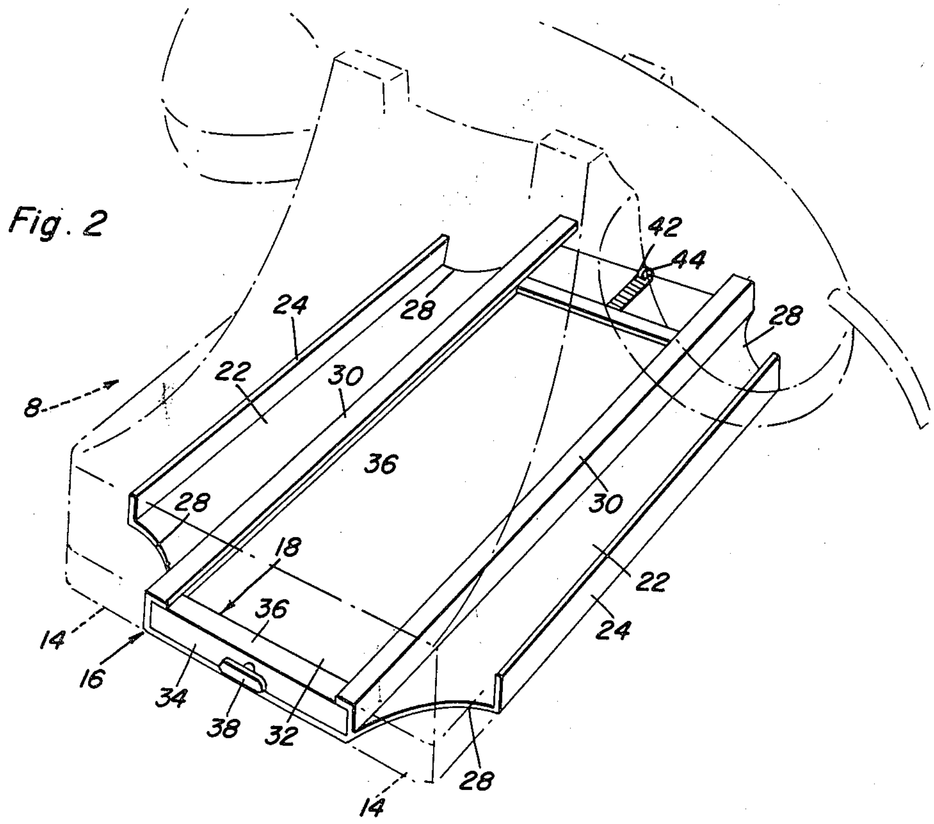
Figure 2 is a perspective view of the attachment in full lines and the telephone stand or base in phantom lines.
Figure 1:
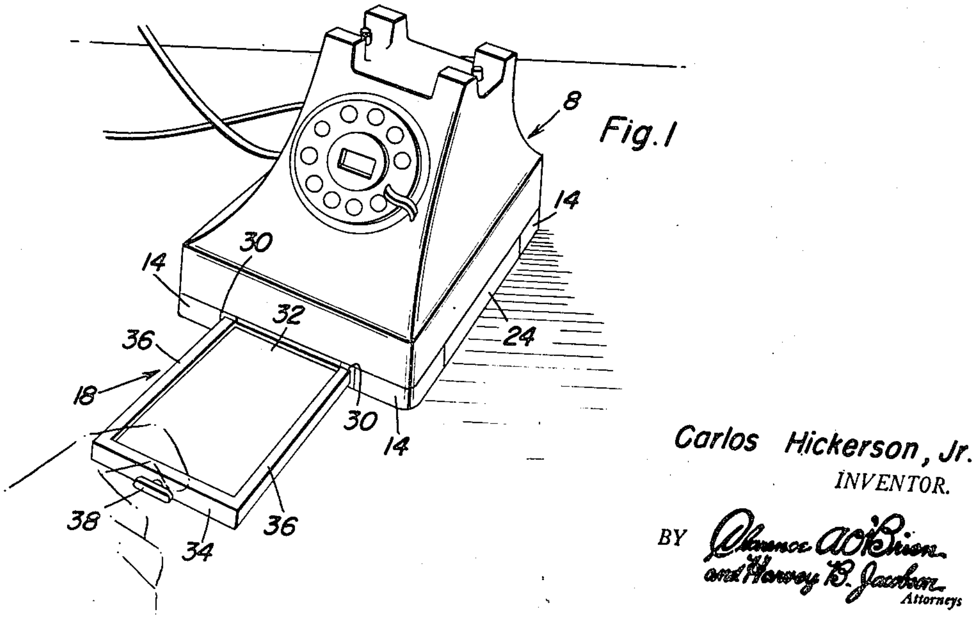
Figure 1 is a perspective view on a small scale showing a dial telephone stand and illustrating how the attachment, the subject matter of the instant invention, is constructed and used in conjunction therewith.
Figure 3:
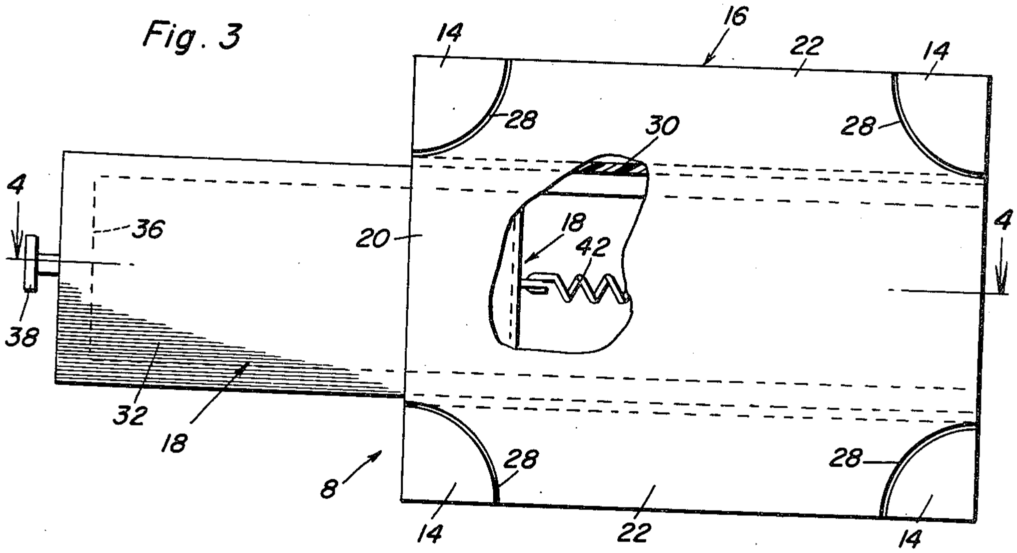
Figure 3 is a bottom plan view of the attachment on the base of the telephone with a portion broken away and shown in section and with the drawer extended for use.
Figure 4:
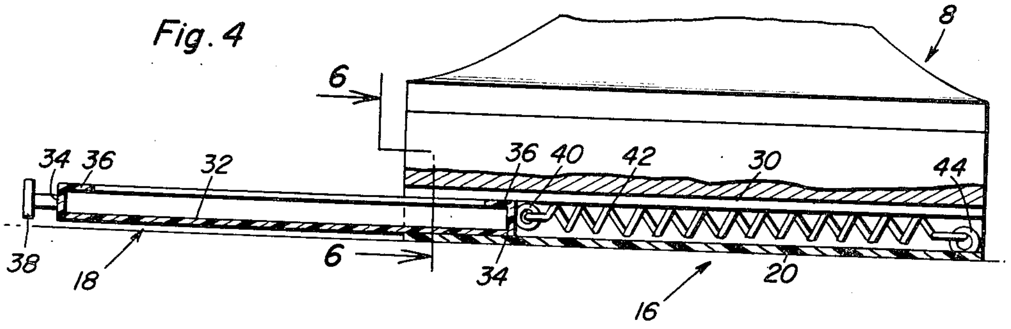
Figure 4 is a section fragmentarily shown and in partial elevation taken on the central line 4—4 of Figure 3, looking in the direction of the arrows.

Referring to the drawings with the aid of reference numerals and accompanying lead lines, the base of the dial type telephone stand is denoted generally by the numeral 8, and it is of customary rectangular form with a bottom 10 spaced above the table or other support surface 12 by four sector-shaped or segmental pads or equivalent feet 14 (see Figure 3). The presence of these four feet provide a space between the bottom 10 and the surface 12, and it is in this space that the attachment, the invention herein under consideration, is fitted with requisite nicety. The attachment is characterized, as before stated, by two companion or complemental parts, one of which is denoted by the numeral 16 and which is treated handily as an adapter in that it fits into the stated space. The other part is the tray-like slidable drawer 18.

Figures 5, 6:
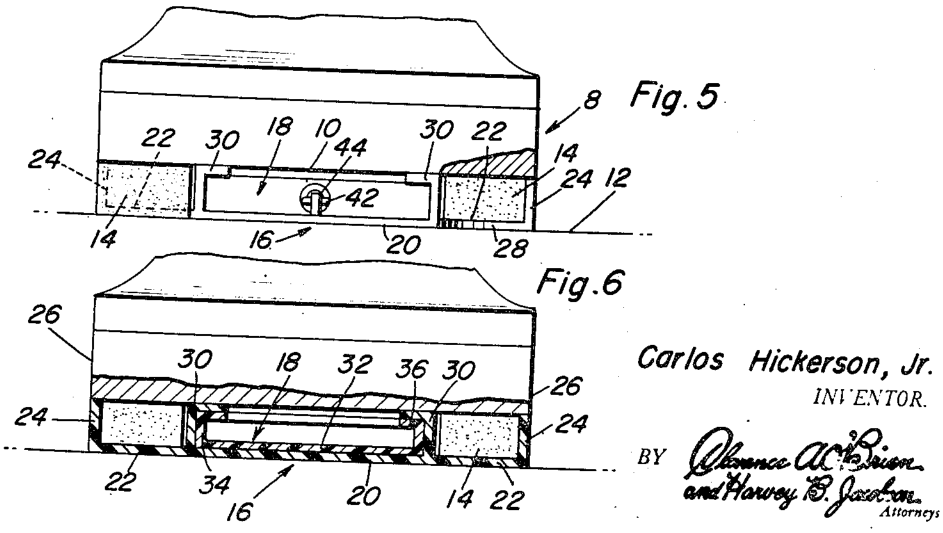
Figure 5 is a fragmentary elevational and sectional view of the rear end of the base.
Figure 6 is a section on the irregular vertical line 6—6 of Figure 4, looking in the direction of the arrows.

With reference to the adapter 16, this is preferably made of commercial plastics and it comprises a bottom, the central portion of which is conveniently denoted by the numeral 20 and the longitudinal edge portions by the numerals 22. These may be treated as extensions, and it will be noticed that along the outer longitudinal edges, they are provided with upstanding flanges 24 which abut the bottom 10 and are flush with the vertical basal surfaces 26. It will also be noticed that the respective end portions of these wing-like extensions 22 have cut-outs or notches 28 which, as best shown in Figure 3, are curved and conform in shape and size to the curvate marginal edge portions of the respective pads 14. The central bottom portion 20 has upstanding spaced parallel angle members 30 formed integral therewith, and these together with the bottom 20 make an open-ended channel-like drawer compartment, with the angle members providing tracks for the drawer. The drawer is also of commercial plastics and is rectangular and fits conformingly into the compartment and it comprises a bottom 32 with upstanding marginal walls or rim portions 34 which may be said to be vertical and which have horizontal flanges 36 which turn in toward each other and overlie the bottom 23 and make a sort of a box-like tray to contain the pad, card or other directory insert (not shown). The numeral 38 denotes a suitable knob-equipped handle for the drawer. In practice, the rear end of the drawer may be provided with an eye 40 to accommodate a lightweight coil spring or, for that matter, a rubber band, denoted at 42 and having its attached end secured to an anchoring eye 44, all as brought out in Figure 5. The drawer may be thus easily slid in and out. In fact, it may be pulled all the way out from the compartment or slideway and turned over. Since the drawer could be of transparent commercial plastics, both sides of the pad (not shown) could be seen. The elastic spring or band would permit it to be rotated and replaced in its compartment and slid back to its retracted out-of-the-way position.

The combined thickness of the drawer and adapter is such that it fits exactly within the depth of the space provided. The attachment is, of course, not directly or physically attached to the telephone base. It fits snugly between the pads and in the stated space, and actually, the weight of the telephone base is imposed thereon and keeps the attachment in position and against undesirable displacement.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use in conjunction with a dial telephone stand characterized by a flat-bottomed face having four depending corner pads on the underneath side and providing feet, said feet elevating said underside of the base above a stationary support surface and defining a handily available and usable space within the encompassing limits of said pads and marginal vertical wall portions of said base, an attachment type accessory designed and adapted to fit into and occupy said space and characterized by a one-piece, relatively stationary adapter unit comprising a generally flat-faced bottom adapted to underlie the underneath side of the telephone base and of an area comparable to that of the area of said telephone base, a pair of spaced parallel duplicate angle members having vertical flanges affixed to the top surface of the central portion of said bottom, said members being commensurate in length with the length of the bottom and embodying horizontal flanges overlying said top surface in spaced parallelism and defining an open ended channel-like drawer accommodation space and a pair of drawer-attaching tracks, said horizontal flanges being directed toward each other and being coplanar, said bottom having lengthwise portions extending outwardly of the respective angle members with their outer longitudinal edge portions adapted to project between the respective adjacent pairs of the aforementioned forward and rearward pads and being provided along said outward edges with vertical upstanding stabilizing flanges, the upper edges of said flanges being flush with each other and substantially coplanar with the top surfaces of the horizontal flanges above mentioned, the latter surfaces and said upper edges being adapted to rest firmly against the underneath side of the telephone base, the exterior vertical surfaces of said stabilizing flanges being adapted to remain flush with the vertical wall portions of said base, a readily insertable and removable drawer occupying said drawer space with longitudinal portions slidable back and forth in said tracks, said drawer being of a length less than the over-all drawer space and having a front which is substantially flush with the front ends of said tracks.

2. The structure defined in claim 1 and wherein the respective transverse ends of said lengthwise portions of said bottom have curvate clearance notches which conform to, abut and thus cooperate with the cooperating curvate edges of the stated pads, said drawer being constructed of transparent commercial plastics and being adapted, if desired, to contain a note pad.

References Cited in the file of this patent

UNITED STATES PATENTS

| | | |
|---|---|---|
| 2,498,770 | Sloane et al. | Feb. 28, 1950 |
| 2,586,543 | Kennedy | Feb. 19, 1952 |

FOREIGN PATENTS

| | | |
|---|---|---|
| 142,559 | Great Britain | May 7, 1920 |
| 256,468 | Great Britain | Aug. 12, 1926 |
| 456,997 | Canada | May 31, 1949 |